US010710320B2

(12) United States Patent
Mehling

(10) Patent No.: US 10,710,320 B2
(45) Date of Patent: Jul. 14, 2020

(54) CONTROLLING APPLICATION OF FORCES TO DIFFERENT PORTIONS OF OBJECT SURFACE USING FLEXIBLE WALL

(71) Applicant: The Boeing Company, Chicago, IL (US)

(72) Inventor: Hans Mehling, Bear, DE (US)

(73) Assignee: The Boeing Company, Chicago, IL (US)

( * ) Notice: Subject to any disclaimer, the term of this patent is extended or adjusted under 35 U.S.C. 154(b) by 426 days.

(21) Appl. No.: 15/666,740

(22) Filed: Aug. 2, 2017

(65) Prior Publication Data

US 2019/0039334 A1    Feb. 7, 2019

(51) Int. Cl.
| B29C 70/44 | (2006.01) |
| B32B 37/10 | (2006.01) |
| B29C 70/34 | (2006.01) |
| B30B 5/02 | (2006.01) |

(Continued)

(52) U.S. Cl.
CPC ............ *B29C 70/44* (2013.01); *B29C 70/342* (2013.01); *B30B 5/02* (2013.01); *B32B 37/10* (2013.01);
(Continued)

(58) Field of Classification Search
CPC ..... B29C 70/44; B29C 70/342; B29C 66/494; B29C 66/51455; B29C 66/92451; B29C 33/505; B29C 33/50; B29C 65/10; B29C 65/00; B30B 5/02; B28B 3/003; B32B 37/10; B29L 2022/025
(Continued)

(56) References Cited

U.S. PATENT DOCUMENTS 6,199,613 B1    3/2001   Petillon
7,622,066 B2   11/2009   Brustad et al.
(Continued)

FOREIGN PATENT DOCUMENTS

| DE | 3001904 A1 | 7/1981 |
| EP | 2308670 A1 | 4/2011 |
| EP | 2671709 A1 | 12/2013 |

OTHER PUBLICATIONS

European Application Serial No. 18185665.9, Search Report dated Dec. 5, 2018.
(Continued)

*Primary Examiner* — Joseph S Del Sole
*Assistant Examiner* — Lawrence D. Hoehenbrink, Jr.
(74) *Attorney, Agent, or Firm* — Kwan & Olynick LLP

(57) ABSTRACT

Provided are methods and apparatuses for processing objects by applying different forces and/or pressure levels to different portions of surfaces of these objects. An apparatus may include a flexible wall and a contact member. In some embodiments, the flexible wall forms a bladder such that the contact member is disposed inside the bladder. During operation, the flexible wall may be pressed against an object using a pressure differential across the wall (e.g., by pressurizing the bladder). This creates a first force acting on a first portion of the object surface. Furthermore, the contact member may be forced against the flexible wall and apply a second force to a second portion of the object surface through the wall. The second portion of the object surface may be a subset of the first portion or an entirely different portion.

31 Claims, 8 Drawing Sheets

(51) Int. Cl.
  *B29C 65/00* (2006.01)
  *B29C 65/10* (2006.01)
  *B29L 22/02* (2006.01)
  *B29C 33/50* (2006.01)

(52) U.S. Cl.
  CPC ............ *B29C 33/50* (2013.01); *B29C 33/505* (2013.01); *B29C 65/00* (2013.01); *B29C 65/10* (2013.01); *B29C 66/494* (2013.01); *B29C 66/81455* (2013.01); *B29C 66/92451* (2013.01); *B29L 2022/025* (2013.01)

(58) Field of Classification Search
  USPC ........................................................ 264/314
  See application file for complete search history.

(56) References Cited

U.S. PATENT DOCUMENTS

| | | |
|---|---|---|
| 8,293,051 B2 | 10/2012 | Morris et al. |
| 9,381,704 B2 | 7/2016 | Hollensteiner et al. |
| 2010/0006739 A1 | 1/2010 | Robins et al. |
| 2010/0139850 A1 | 6/2010 | Morris et al. |
| 2012/0061006 A1* | 3/2012 | Marquardt ............ B29C 70/44 156/94 |
| 2013/0327477 A1* | 12/2013 | Hollensteiner ....... B29C 33/505 156/245 |
| 2016/0339682 A1* | 11/2016 | Bahe .................... B29C 33/505 |
| 2019/0039333 A1 | 2/2019 | Mehling |
| 2019/0039334 A1 | 2/2019 | Mehling |

OTHER PUBLICATIONS

European Application Serial No. 18185667.5, Search Report dated Dec. 5, 2018.
Application Serial No. GC2018-35756, Office Action dated Mar. 21, 2020, 7 pgs.
Application Serial No. GC2018-35757, Office Action dated Mar. 23, 2020, 6 pgs.

* cited by examiner

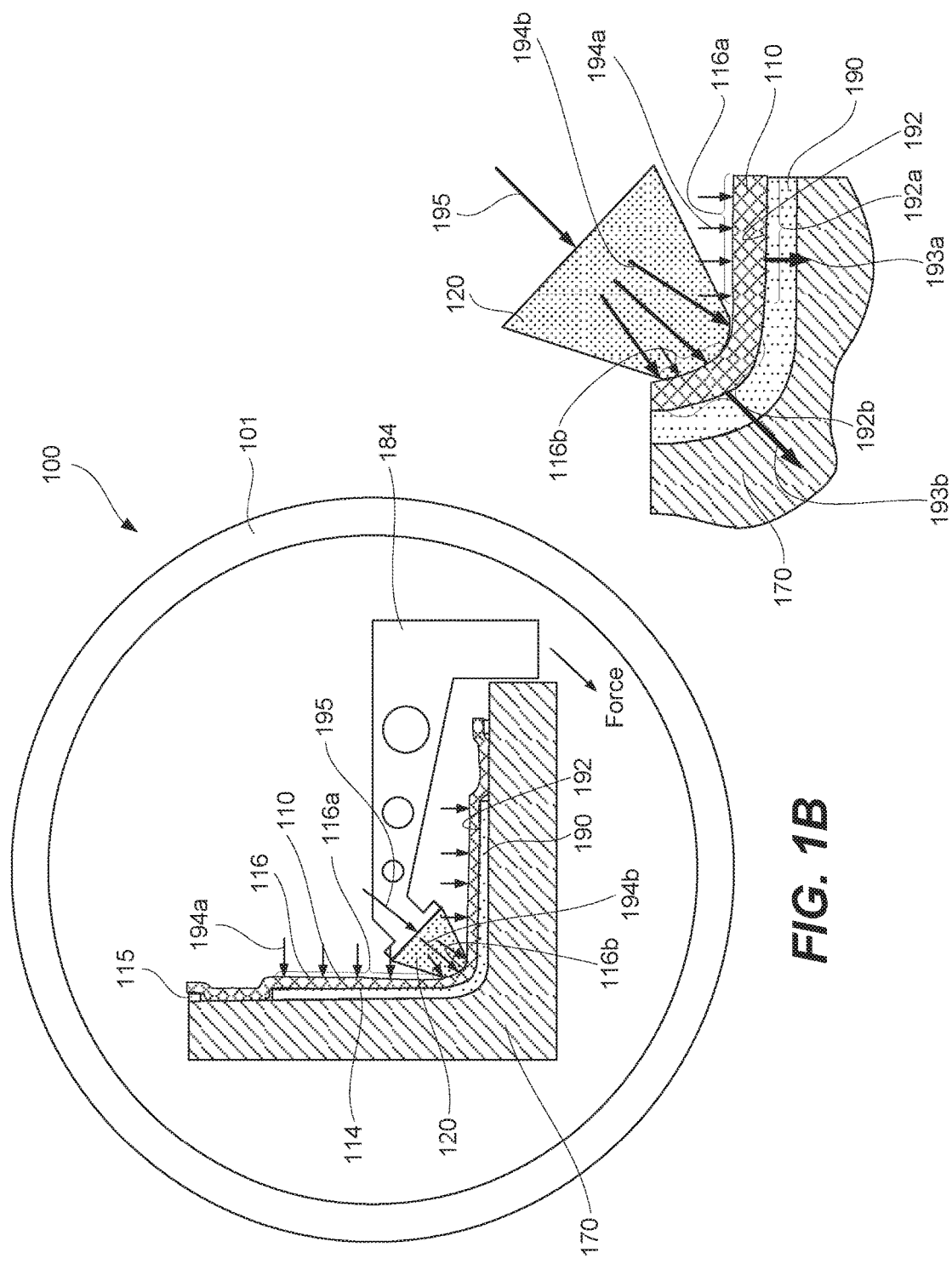

CONTROLLING APPLICATION OF FORCES TO DIFFERENT PORTIONS OF OBJECT SURFACE USING FLEXIBLE WALL

BACKGROUND

Pressurized bladders or diaphragms, which may be also referred to as inflatable mandrels or simply bags, are used in many applications to apply pressure to irregularly shaped surfaces or surfaces that may change shape during processing and application of the pressure. Specifically, a pressurizing fluid, such as a gas or liquid, may be flown into a bag thereby pressurizing the bag. The bag may be held against the surface of an object and exert a uniform pressure onto the surface, regardless the shape of the surface. The pressurizing fluid is only capable to uniformly exert the pressure on the interior surface of the bag. As such, typically, the bag is only capable of exerting uniform pressure onto the surface. While this pressure uniformity may be ideal for some applications, various other applications may benefit from something other than a uniform pressure distribution. For example, stretching/reshaping of various portions of the bag may cause bridging, i.e., when the bag separates or not adequately pressed on the part, and may require something more than pressure uniformity to overcome this stretching/reshaping. What is needed are methods and apparatuses for applying different pressure levels to different portions of surfaces.

SUMMARY

Provided are methods and apparatuses for processing objects by applying different forces and/or pressure levels to different portions of surfaces of these objects. An apparatus may include a flexible wall and a contact member. In some embodiments, the flexible wall forms a bladder such that the contact member is disposed inside the bladder. During operation, the flexible wall may be pressed against an object using a pressure differential across the wall (e.g., by pressurizing the bladder). This creates a first force acting on a first portion of the object surface. Furthermore, the contact member may be forced against the flexible wall and apply a second force to a second portion of the object surface through the wall. The second portion of the object surface may be a subset of the first portion or an entirely different portion.

In some embodiments, a method of controlling application of forces to a first portion and a second portion of a surface of an object comprises applying a first force to the first portion of the surface of the object. The first force is applied using a bladder formed by a flexible wall. The method further comprises applying a second force to the second portion of the surface of the object. The second force is also applied using the bladder.

In some embodiments, applying the first force comprises pressurizing the bladder, such as flowing pressurizing fluid into the bladder. Applying the second force may comprise applying an external force to a contact member disposed inside the bladder. In some embodiments, the contact member is permeable. Applying the first force may comprise pressurizing the bladder, which further comprises applying the first force to the second portion of the surface of the object, in addition to the second force.

In some embodiments, the contact member is compressible. In these embodiments, the method may further comprise positioning the bladder between the object and a back support. This positioning operation may be performed while the pressure inside the bladder is less than or equal to the pressure outside of the bladder. The positioning operation may be performed while the contact member is compressed.

In some embodiments, the method further comprises positioning the bladder between the object and a back support. Applying the external force to the contact member may comprise advancing the back support toward the object.

In some embodiments, prior to applying the second force, the contact member is positioned away from the flexible wall. Alternatively, the contact member may be attached to the flexible wall.

In some embodiments, the vector of the first force and the vector of the second force have substantially opposite directions. Furthermore, the magnitude of the first force may be different from the magnitude of the second force.

In some embodiments, the second portion of the surface comprises a corner. The corner may need a higher force than, for example, a planar portion of the object surface. This additional force may be used to prevent bridging in the corner.

In some embodiments, applying the first force and applying the second force overlap in time. In the same or other embodiments, the first force and applying the second force are staggered in time. For example, the second force may be applied before applying the first force.

In some embodiments, the method further comprises changing the first force or the second force while applying the first force and the second force. For example, the method may comprise receiving a sensor input, and changing the first force or the second force may be performed based on this sensor input. In some embodiments, the sensor input comprises one or more of a pressure input, a temperature input, and a visual input.

Also provided is a pressurizable tooling device. The device may comprise a flexible wall, forming a bladder. The flexible wall comprising an inner surface. The inner surface comprises a contact portion and a non-contact portion. The pressurizable tooling device also comprises a contact member, contacting the contact portion of the inner surface of the flexible wall. The contact member may be positioned away from the non-contact portion of the inner surface of the flexible wall.

In some embodiments, the contact member is permeable. Furthermore, the contact member may be compressible. The contact member may one of an open-cell foam or a spring. In some embodiments, the contact member is attached to the contact portion of the inner surface. Furthermore, the surface of the contact member contacting the contact portion of the inner surface is non-planar. The flexible wall may be formed from an elastomeric material.

In some embodiments, the pressurizable tooling device further comprises a controller and a valve. The controller may be communicatively coupled to the valve for controlling a pressure inside the bladder. The pressurizable tooling device may further comprise a sensor communicatively coupled to the controller. The sensor may be selected from the group consisting of a pressure sensor, a temperature sensor, and a visual sensor, and wherein the controller is configured to control the pressure inside the bladder based on input from the sensor.

In some embodiments, a method of controlling application of forces to a first portion and a second portion of a surface of an object comprises sealing a flexible wall against a back support. The object is disposed in a sealed space between the flexible wall and the back support. The method then proceed with applying a first force to the first portion of the surface using the flexible wall. The method also involves applying a second force to the second portion of the surface using the flexible wall.

In some embodiments, applying the first force comprised creating a pressure gradient across the flexible wall. Creating the pressure gradient across the flexible wall comprises reducing a pressure in the sealed space. Reducing the pressure in the sealed space may be performed while maintaining a pressure outside of the sealed space at a constant level. The pressure outside of the sealed space may be an ambient pressure.

In some embodiments, creating the pressure gradient across the flexible wall comprises positioning the flexible wall, the back support, and the object into a pressure chamber and increasing the pressure inside the pressure chamber. Increasing the pressure inside the pressure chamber may be performed while maintaining a pressure inside the sealed space at a constant level. In some embodiments, the constant level of the pressure inside the sealed space is at an ambient pressure level. Furthermore, vacuum can also be drawn on the sealed space.

In some embodiments, applying the second force comprises applying an external force to a contact member. The second portion of the surface corresponding to the contact member. Applying the external force to the contact member may be performed using a positioning device. Applying the external force to the contact member may comprise advancing the positioning device toward the back support.

In some embodiments, the magnitude the first force is different from the magnitude of the second force. Applying the first force and applying the second force may overlap in time. Furthermore, applying the first force and applying the second force may be staggered in time. In some embodiments, the second portion of the surface comprises a corner.

Also provided is a method of controlling application of forces to different portions of two surfaces of an object. The method may comprise positioning a bladder, formed by a first flexible wall, within a cavity formed by the object and a back support. The bladder may comprise a cavity with a first contact member positioned inside the cavity. The method may proceed with sealing a second flexible wall against the object or the back support. The object may be disposed between the second flexible wall and the back support. The method also involves applying a first force to a first portion of a first surface of the object using the first flexible wall. Applying the first force may comprise pressurizing the bladder. Furthermore, the method may proceed with applying a second force to a second portion of the first surface of the object using the first flexible wall. The second portion of the surface corresponds to the first contact member. In some embodiments, the method also involves applying a third force onto a third portion of a second surface of the object using the second flexible wall. The third portion of the second surface may correspond to a second contact member. Applying the second force may comprise applying an external force to the second contact member.

In some embodiments, at least a portion of the object is disposed between the first flexible wall and the second flexible wall. Each of the first force, the second force, and the third force may be independently controllable. The method may further comprise changing one of the first force, the second force, or the third force while applying all of the first force, the second force, and the third force. The method may also comprise applying a fourth force to a fourth portion of the second surface of the object using the second flexible wall. Applying the fourth force comprises applying a pressure across the second flexible wall. This application of the fourth force may be based on the sensor input.

In some embodiments, a pressurizable tooling device for controlling application of forces to different portions of two surfaces of an object comprises a back support and a flexible wall, comprising an inner surface and an outer surface. The inner surface comprises a contact portion and a non-contact portion. The outer surface may be operable to seal against the object or the back support. The pressurizable tooling device also comprises a contact member, operable to contact the contact portion of the inner surface of the flexible wall. The contact member is positioned away from the non-contact portion of the inner surface of the flexible wall. The pressurizable tooling device also comprises a positioning device, supporting the contact member and operable to move the contact member relative to the flexible wall.

In some embodiments, the pressurizable tooling device further comprises a pressure chamber. The back support, the flexible wall, the contact member, and the positioning device may be disposed inside the pressure chamber.

The contact member is permeable. In the same or other embodiments, the contact member is compressible. The contact member may be one of an open-cell foam or a spring. The surface of the contact member contacting the contact portion of the inner surface may be non-planar.

The flexible wall may be formed from an elastomeric material. In some embodiments, the flexible wall comprises a seal for sealing the flexible wall against a back support in the pressure chamber. The seal may extend the entire perimeter of the flexible wall.

In some embodiments, the pressurizable tooling device further comprises a controller and a sensor communicatively coupled to the controller. The may be one of a pressure sensor, a temperature sensor, or a visual sensor. The controller may be configured to control the first pressure based on input from the sensor. Furthermore, other parameters may be controlled based on this sensor input.

BRIEF DESCRIPTION OF THE DRAWINGS

FIGS. 1A-1D are schematic illustrations of various examples of a pressurizable tooling device.

DETAILED DESCRIPTION

Figure 1A:
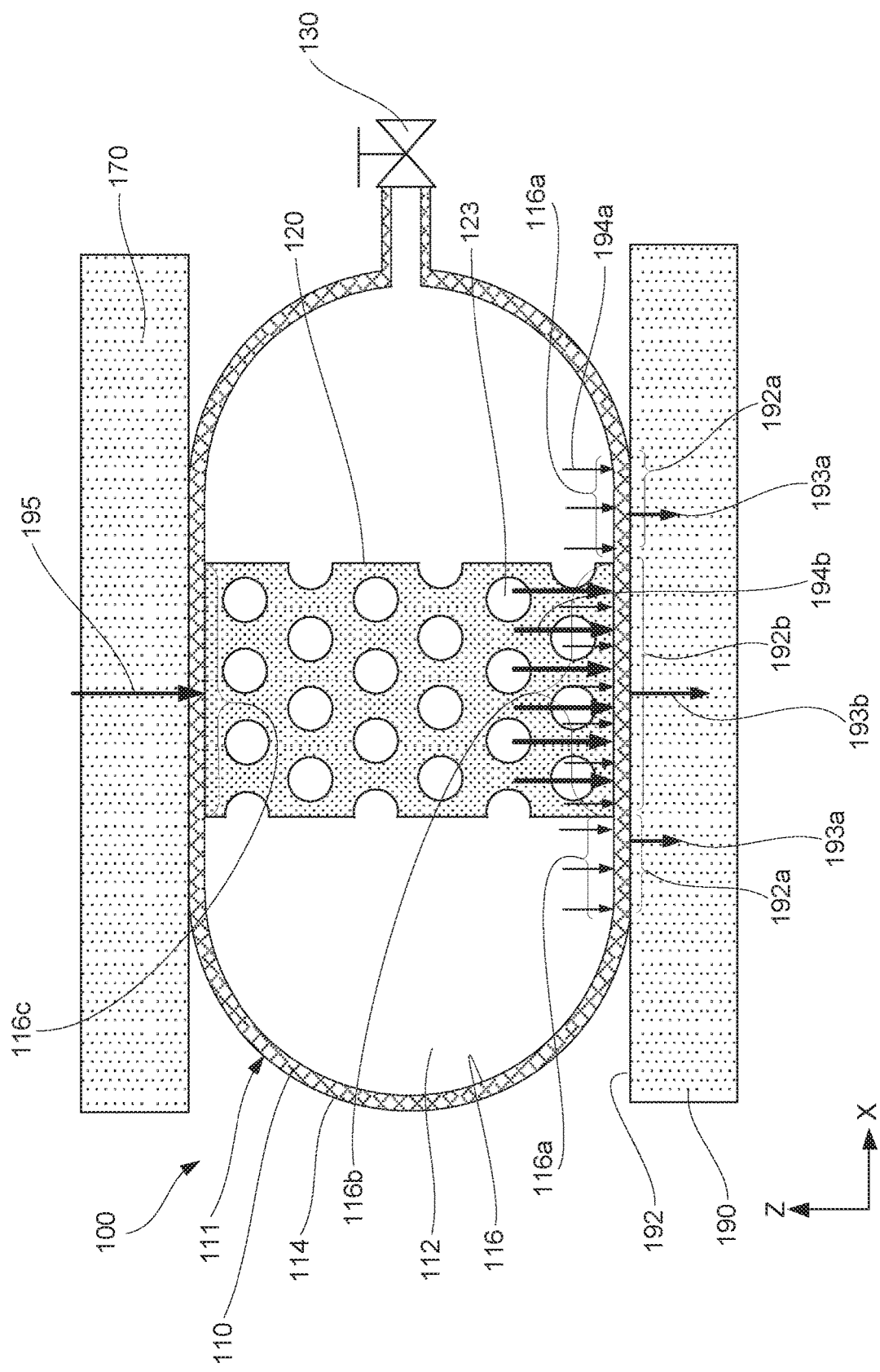

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Conventional pressurized bladders, which may be also referred to as inflatable mandrels, are typically used to apply pressure and forces to various surfaces of processed objects. In particular, pressurized bladders may be used to press on irregularly shaped surfaces and/or surfaces that change their shapes during processing. A design of such pressurized bladders combines a uniform interior pressure acting on the flexible wall of a bladder as well as the ability of this flexible wall to conform to different types of surfaces. However, these conventional devices are not designed to independently control levels of pressure and/or force applied to different portions of the same surface. The conventional pressurized bladders are generally limited to apply a uniform pressure/evenly distributed force to the entire surface.

A pressurizable tooling device described herein addresses this deficiency and allows to independently control and change pressure levels and/or force levels applied to different portions of the same surface of an object. For example, processing of an object may require a higher pressure/force in one portion on the surface of this object (e.g., in a corner) and a lower pressure/force in another portion (e.g., on a planar portion). A single pressurizable tooling device may be used for this processing. Specifically, the same pressurizable tooling device may subject different portions of the same surface to different levels of pressure/force. These pressure/force levels may be substantially different and far exceed variations associated, for example, with stretching and/or corner effects. In some embodiments, the difference of the pressure/force magnitude (simultaneously applied to different portions of the same surface) may be at least about 25%, at least about 50%, at least about 100%, or even at least about 200%. It should be noted that, in some embodiments, the pressurizable tooling device (described herein) may be also used to apply substantially uniform pressure/force to the surface of the object (e.g., with pressure variations less than 10%, less than 5%, or even less than 1%), if such uniformity is needed. In other words, the described pressurizable tooling device retain the functionality of conventional pressurized bladders, while add additional features not previously available. For example, the independent pressure/force control at different portions of the surface may be also used to dynamically modify these levels during processing.

This level of control may be particularly useful for curing composite objects (e.g., "green" composite structures) that have complex shapes. In this example, a higher pressure may be used at one or more location where a higher external pressure is expected. For example, a pressurizable tooling device may be used to support a "green" composite structure with an interior cavity of this structure against crushing when the composite structure is subjected to exterior consolidation forces (e.g., forces from a vacuum bag). One having ordinary skill in the art would understand that various other applications are also within the scope. In general, a pressurizable tooling device may be used for any applications requiring two or more different pressure levels. Furthermore, while general references are made to different pressure levels, one having ordinary skill in the art would understand, that applying a pressure corresponds to application of forces and a pressurizable tooling device can be used to apply difference forces. The term "force" and "pressure" may be used interchangeably in some instances.

In some embodiments, the pressurizable tooling device includes a flexible wall and a contact member. During operation, a first side (e.g., an outer side) of the flexible wall may be positioned against the surface of the object. A first pressure is applied to a second side (e.g., an inner side) of the flexible wall (opposite of the first wall). For example, the flexible wall may form an enclosed bladder, which may be pressurized during this operation. The bladder may be position between the object and the back support. Alternatively, a stack including the flexible wall and the object may be positioned in a pressure chamber, which is pressurized to press the flexible wall against the object.

The first pressure translates into a pressure and corresponding forces applied by the flexible wall to the surface of the object (which is being processed with the device). As such, a portion of the surface contacting the flexible wall experiences a first force. In some embodiments, the pressure/force applied to the object surface by the flexible wall may be substantially the same as the pressure/force applied to the second side (e.g., an inner side) of the flexible wall. In other words, the losses/deviations attributed to stretching/reshaping of the flexible wall may be negligible during this operation. However, in some instances, this stretching/reshaping may cause bridging (when the flexible wall does not follow the shape of the part. The force differentiation may be used to overcome bridging. For example, some portions of the flexible wall may be stretched more using additional force exerted by the contact member. Furthermore, the pneumatic pressure or the hydraulic pressure acting on the flexible wall is uniform. As such, the pressure and the force distribution transferred by the flexible wall to the surface of the object may be also uniform.

The contact member contacts a portion of the second side of the flexible wall and applies a force to this portion, which may be also viewed as a second pressure, to distinguish it from the first pressure. Specifically, the contact member may be forced against the flexible wall using a controlled force (e.g., directly applied to the contact member using a positioning device, or by pressing onto the contact member through the flexible wall, when the contact member is positioned inside the bladder formed by the flexible wall). The amount of forced applied to the contact member may be selected based on the desired force and/or pressure that needs to be applied to the second portion of the object surface.

In some embodiments, the contact member is permeable to the fluid. As such, the first pressure (e.g., produced by pressurizing the bladder) is also applied to the portion of the flexible wall interfacing the contact member. As such, the portion of the flexible wall, which contacts the contact member, may experience a combination of pressures and corresponding forces.

It should be noted that different pressures/forces applied to different portions (e.g., the contact portion and the non-contact portion) of the inner surface of the flexible wall are transferred by the flexible wall to the object surface. As such, the object surface also experiences different levels of pressure and force. Assuming no losses through the flexible wall, these pressures/forces applied to the portions of the flexible wall would be the same as pressure/force levels acting on the surface of the object, which is in contact with the flexible wall. As such, the reference can be made to a first pressure/force being applied to the non-contact portion of the flexible wall and to a first portion of the surface of the object, which corresponds to this non-contact portion. Likewise, the reference can be made to a combined pressure/force (e.g., first and second pressure/force) being applied to the contact portion of the flexible wall and to a second portion of the surface of the object, which corresponds to this contact portion.

As noted above, the pressurizable tooling device may also independently control each of the first pressure and the second pressure (and corresponding forces). This control may be performed without having to add or remove the pressurizable tooling device during processing or, more specifically, while applying pressure/forces using the device. For example, the first pressure may be kept the same (e.g., the fluid pressure inside the bladder formed by the flexible wall may be contestant), while the second pressure may be changed (e.g., by changing the level of contact between the contact member and the flexible wall or, more specifically, by changing the force with which the contact member is forced against the flexible wall). Alternatively, the first pressure may be changed (e.g., the fluid pressure inside the bladder formed by the flexible wall may be changed by pumping the fluid in or out of the bag), while the second pressure may be the same (e.g., by maintaining the same level of contact between the contact member and the flexible wall or, more specifically, not changing the force applied to the contact member). Furthermore, both the first pressure and the second pressure may be independently changed with respect to each other. This dynamic pressure/force approach is contrary to the conventional pressure bags, which are designed to exert uniform pressure on processed surfaces (with the pressure being uniform at all times, even if it is changed). As such, the pressurizable tooling device described herein allows higher levels of pressure control (e.g., independent control for different portions) thereby improving quality, saving the costs, reducing rework or repair, and allowing new types of processes and designs. The pressurizable tooling device also expands processing capabilities which could enable the performance of new work, or simplification of processes which may currently require multi-step processing.

Pressurizable Tooling Device Examples

FIGS. 1A-1D illustrate examples of pressurizable tooling device 100 for applying different pressure/force levels to different portions of surface 192 of object 190, which are also shown in these figures for reference. One having ordinary skill in the art would understand that object 190 is not a part of pressurizable tooling device 100. Pressurizable tooling device 100 is used for processing object 190 and is a separate component. During processing, pressurizable tooling device 100 comes in contact with object 190 as, for example shown in FIGS. 1A-1D while applying different pressure/force levels to different portions of surface 192 of object 190.

Pressurizable tooling device 100 comprises flexible wall 110 and contact member 120. Each of these components will now be described in more detail. Flexible wall 110 comprises first surface 114 and second surface 116, opposite of first surface 114. When flexible wall 110 forms a bladder as, for example, is shown in FIG. 1A, first surface 114 may be also referred to as outer surface, while second surface 116 may be referred to as an inner surface.

During operation of pressurizable tooling device 100, first surface 114 comes in contact with surface 192 of object 190. Second surface 116 comprises two portions, contact portion 116b and non-contact portion 116a. Referring to FIGS. 1A and 1C, contact member 120 may contact (e.g., during operation or at all times) or be attached to contact portion 116b of second surface 116 of flexible wall 110. Contact member 120 does not contact non-contact portion 116a of second surface 116.

This position of contact member 120 relative to contact portion 116b and non-contact portion 116a of second surface 116 allows subjecting contact portion 116b and non-contact portion 116a to different pressure/force levels during operation. Specifically, controlling the level of contact between contact member 120 and contact portion 116b (e.g., by controlling the force applied to contact member 120) allows to control the total pressure/force applied to contact portion 116b. It should be noted that this total pressure/force is a combination of a pressure exerted uniformly to entire second surface 116 (which may be referred to as first pressure 194a) and a pressure exerted exclusively to contact portion 116b by contact member 120 (which may be referred to second pressure 194b). First pressure 194a may be a hydraulic pressure or a pneumatic pressure and is exerted by a fluid (e.g., liquid or gas) contacting entire second surface 116. As shown in FIG. 1A, second pressure 194b may be a mechanical pressure exerted by contact member 120 and determined by the level of contact between contact member 120 and contact portion 116b.

For example, the total pressure (i.e., a combination of first pressure 194a and second pressure 194b) exerted to contact portion 116b may be higher than the pressure (i.e., first pressure 194a) exerted on non-contact portion 116a. In this example, second pressure 194b applied by contact member 120 onto contact portion 116b may be referred to as a positive pressure. In other words, first pressure 194a and second pressure 194b and corresponding forces are applied in the same direction as, for example, shown in FIG. 1A.

It should be noted that forces associated with first pressure 194a may not always have the same direction as forces associated with second pressure 194b (or simply second forces). In general, the forces associated with first pressure 194a are directed toward surface 192 of object 190. However, contact member 120 may either push flexible wall 110 toward surface 192 or pull flexible wall 110 away from surface 192. For example, contact member 120 may be attached to flexible wall 110 or, more specifically, to contact portion 116b of flexible wall. In this example, contact member 120 may pull contact portion 116b away from object 190, in which case the total pressure (i.e., a combination of first pressure 194a and second pressure 194b and corresponding forces) exerted to contact portion 116b may be less than first pressure 194a (exerted on non-contact portion 116a). In this example, the pressure/force applied by contact member 120 onto contact portion 116b may be referred to as a negative pressure/negative force.

Figure 5A:
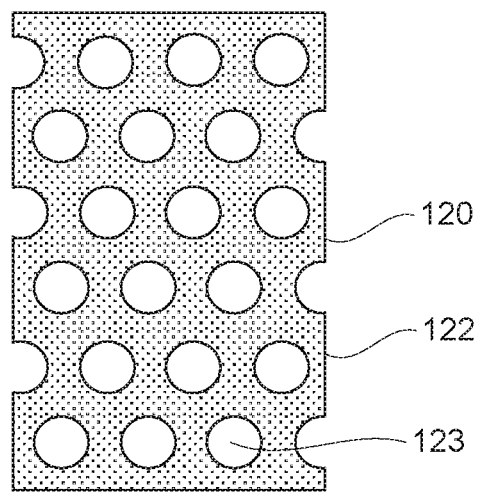
FIGS. 5A-5C are schematic illustrations of different examples of a contact member of the pressurizable tooling device.
Figure 5B:
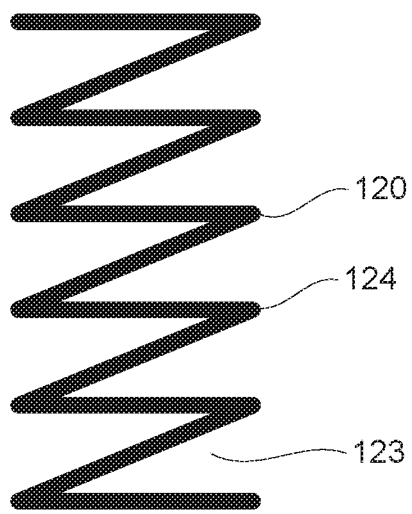

Contact member 120 may be permeable to one or more fluids used for applying first pressure 194a. This permeability feature allows the fluids to exert first pressure 194a directly to contact portion 116b of flexible wall 110 rather than transferring this pressure through contact member 120. For example, contact member 120 may have open cells or other types of openings 123 that allow the fluid to reach contact portion 116b of second surface 116 even when contact member 120 is in contact with this contact portion 116b. Some examples of contact member 120 include open-cell foam 122 (illustrated in FIG. 5A), spring 124 (illustrated in FIG. 5B), and the like. While the pressurizing fluid is supplied and/or removed (e.g., from bladder 111), this fluid flows through contact member 120. In some embodiments, the pressurizing fluid may be removed from pressurizable tooling device 100 or, more specifically, from bladder 111 (shown in FIG. 1A) or from pressure chamber 101 (shown in FIG. 1B) prior to using pressurizable tooling device 100.

Alternatively, contact member 120 may be non-permeable. In this case, contact member 120 blocks the pressurizing fluid from reaching a portion of flexible wall 110 where contact member 120 interfaced with flexible wall 110. In some embodiments, the force, with which contact member 120 acts on flexible wall 110, only corresponds to second force 193b applied to object 190 and there is no contribution from the pressurized fluid in this second portion 192b of the object surface. Alternatively, contact member 120 may be operable as a piston and may generate an additional force from pressurized fluid (e.g., when contact member 120 does not extend across the bladder formed by the flexible wall).

In some states, contact member 120 may not apply any additional pressure and/or force on flexible wall 110 or, more specifically, on contact portion 116b of flexible wall 110. In these states, both contact portion 116b and non-contact portion 116a may be subjected to the same pressure (e.g., from the pressurizing fluid contacting second surface 116). Furthermore, contact member 120 may be separated from contact portion 116b (i.e., not contact this portion) during some operating stages. This ability to separate may be used, for example, for removal/replacement of contact member 120 when not in use, application of the uniform pressure (e.g., when contact member 120 does not contact flexible wall 110 and second pressure 194b is effectively zero), and other purposes.

In some embodiments, contact member 120 is attached to contact portion 116b of second surface 116. For example, contact member 120 may be glued to, adhered to, molded into, welded to, monolithically integrated to contact portion 116b, or otherwise coupled together. Contact member 120 may be permanently attached to contact portion 116b of second surface 116 or removably attached. Alternatively, contact member 120 may be unattached to contact portion 116b of second surface 116, which allows to move contact member 120 away from contact portion 116b.

Contact member 120 may be compressible, in addition or instead of being permeable. This compressible feature may be used to conform contact member 120 to various shapes of contact portion 116b and/or to control the pressure/force distribution which contact member 120 exerts onto contact portion 116b. For example, the level of compression of contact member 120 (e.g., dimensional changes of contact member 120 along the Z axis) may correspond to the force and pressure exerted onto contact portion 116b (e.g., higher dimensional compression corresponding to a higher pressure and vice versa). Furthermore, the compressible feature may be used to ensure that contact member 120 conforms to contact portion 116b. Specifically, first surface 114 of flexible wall 110 may conform to surfaces 192 of object 190, which may change the shape of contact portion 116b. The compressibility of contact member 120 may allow for these changes in shape without loss of contact between contact member 120 and contact portion 116b. Some examples of contact member 120 are an open-cell foam 122 (shown in FIG. 5A), spring 124 (shown in FIG. 5B), and a hydraulic device.

Alternatively, contact member 120 may be a non-compressible (e.g., a metal block). The non-compressible feature may be useful when surface 192 of object 190 may need to be smoothened (e.g., planarized) while being processed with inflatable tooling device 100.

Figure 5C:
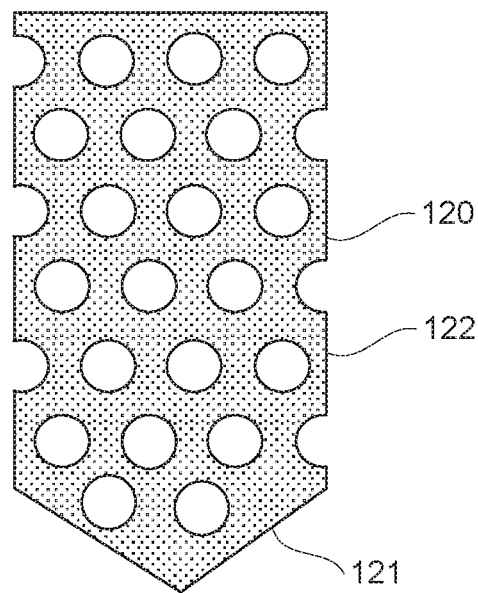

In some embodiments, surface 121 of contact member 120 (which contacts flexible wall 110 or, more specifically, contact portion 116b of second surface 116) may be non-planar as, for example, show in FIG. 5C. Non-planar surface 121 may be used, for example, to exert uneven pressure (provide uneven force distribution) onto contact portion 116b surface 116 and/or to apply even pressure (provide even force distribution) when the profile of surface 121 matches the profile of second portion 192b of surface 192 of object 190 (assuming that flexible 110 can easily conform to any profile).

The difference between even or uneven pressure/force distribution exerted by surface 121 of contact member 120 (onto contact portion 116b of second surface 116) may depend, for example, on the compression of contact member 120. For example, if the shapes of surface 121 and second portion 192b are different (e.g., one is planar and the one is non-planar), then contact member 120 will be compressed differently at different points on surface 121. The points with a higher compression will experience higher pressures/forces and vice versa. For example, FIG. 4D illustrates one example of an uneven pressure profile applied to second surface 116. This pressure profile example may be a result of applying pressure/force onto a planar surface of object 190 with contact member 120 shown in FIG. 5C. Referring again to FIG. 4D, the second pressure is greater at the center ($P_{2\text{-}max}$) than at the edges ($P_{2\text{-}min}$) because the compression of contact member 120 at the center is greater (the center of contact member 120 protrudes further than the edges resulting in a higher pressure). As a result, the center of contact portion 116b will experience a higher pressure total pressure ($P_{t\text{-}max}$) that the edges ($P_{t\text{-}min}$). If the shape of surface 121 of contact member 120 and second portion 192b are both planar or both non-planar but complementary, then the pressure exerted by contact member 120 may be uniform throughout second portion 192b as, for example, shown in FIGS. 4A-4C. It should be note that the pressure corresponding to second portion 192b ($P_t$) is typically different from the pressure corresponding to first portion 192a ($P_1$). Furthermore, the pressure corresponding to first portion 192a ($P_1$) is generally uniform. As noted earlier, any possible pressure variations in first portion 192a (e.g., due to stretching of flexible wall 110) are negligible relative to a typical difference between the pressure corresponding to second portion 192b ($P_t$) and the pressure corresponding to first portion 192a ($P_1$).

Turning to another component of pressurizable tooling device 100, in some embodiments, flexible wall 110 is formed from an elastomeric material e.g., rubber, polymer. As such, flexible wall 110 may be stretchable. Alternatively, flexible wall 110 may be non-stretchable. For example, flexible wall 110 may be formed from a thin flexible sheet of metal (e.g., foil). Flexible wall 110 may easily conform to the shape second portion 192b without exerting substantial additional pressure/forces onto second portion 192b and/or contact member 120 (e.g., due to deformation and/or stretching). Thereby pressure/forces applied to flexible wall 110 by the pressurizing fluid and contact member 120 may be the same as pressure/forces applied by flexible wall 110 onto surface 192 of object 190. The thickness of flexible wall 110 may be uniform.

Referring to FIG. 1A, flexible wall 110 may form bladder 111 comprising internal cavity 112. In this example, bladder 111 may be also referred to as an inflatable mandrel. Contact member 120 may be disposed within internal cavity 112 of bladder 111. Flexible wall 110 may comprise valve 130 for filling internal cavity 112 of bladder 111 with pressurizing fluid e.g., liquid or gas. Valve 130 is connectable to source 182 of pressurizing fluid e.g., gas tank, pump and/or to a device for removing the fluid from bladder 111, e.g., pump.

In some embodiments, contact member 120 extends across bladder 111 and interfaces contact portion 116b of second surface 116 and additional contact portion 116c of second surface 116 as, for example, shown in FIG. 1A.

Additional contact portion 116c may provide support to contact member 120 while contact member 120 exerts pressure/force on contact portion 116b. In this approach, contact member 120 does not need to be externally supported, e.g., using positioning device 184 as later described with reference to FIG. 1B. The distance between contact portion 116b and additional contact portion 116c of flexible wall 110 (which may be referred to as a thickness of bladder 111) may be used to control the compression of contact member 120 and, as a result, the pressure/force, which contact member 120 exerts on contact portion 116b. As such, bladder 111 may be compressed or expanded to control second pressure 194b and corresponding forces acting onto flexible wall 110. It should be noted that the amount of fluid inside bladder 111 controls first pressure 194a and corresponding forces acting onto flexible wall 110.

Referring to FIG. 1B, in some embodiments, pressurizable tooling device 100 further comprises positioning device 184 supporting contact member 120. Positioning device 184 may be configured to move contact member 120 relative to flexible wall 110 and, in some embodiments, to apply force to contact member 120. This movement may be used to control the pressure and/or force exerted by contact member 120 onto flexible wall or, more specifically, onto contact portion 116b of flexible wall 110. This exerted pressure/force is then transferred by flexible wall 110 to surface 192 of object 190. For example, positioning device 184 may force contact member 120 toward object 190 to increase the pressure/force. Alternatively, positioning device 184 may move contact member 120 away from object 190 to decrease the pressure/force.

Referring to FIG. 1B, pressurizable tooling device 100 may comprise pressure chamber 101. Flexible wall 110 and contact member 120 are disposed within pressure chamber 101. During operation of pressurizable tooling device 100, object 190 is also disposed inside pressure chamber 101. Pressure chamber 101 may be used to contain the pressurizing fluid while applying first pressure 194a and corresponding forces to flexible wall 110. Similar to the example presented in FIG. 1A, flexible wall 110 is positioned between the pressurizing fluid and object 190 in the example shown in FIG. 1B. Pumping the pressurizing fluid in or out of pressure chamber 101 changes first pressure 194a resulting in different forces applied to non-contact portion 116a of flexible wall 110 and a corresponding portion of object 190. It should be noted that pressure chamber 101 may also operate at an ambient pressure such that first pressure 194a is not applied to flexible wall 110.

Flexible wall 110 may comprise seal 115 for sealing flexible wall 110 against back support 170 (as shown in FIG. 1B) or, in another example, against surface 192 of object 190. As such, a combination of flexible wall 110, back support 170, and pressure chamber 101 are collectively operable as an inflatable mandrel. Seal 115 may extend the entire perimeter of flexible wall 110. Due to seal 115, the pressurizing fluid is not able to go between flexible wall 110 and object 190, thereby creating a pressure differential and application of first pressure 194a onto flexible wall 110 and against object 190. Furthermore, when the pressure inside pressure chamber 101 is changed, the pressure across flexible wall 110 is also changed thereby exerting pressure/force on surface 192 of object 190 contacting flexible wall 110. One example of pressure chamber 101 is an autoclave. However, other types of chambers are also within the scope.

Figure 1D:
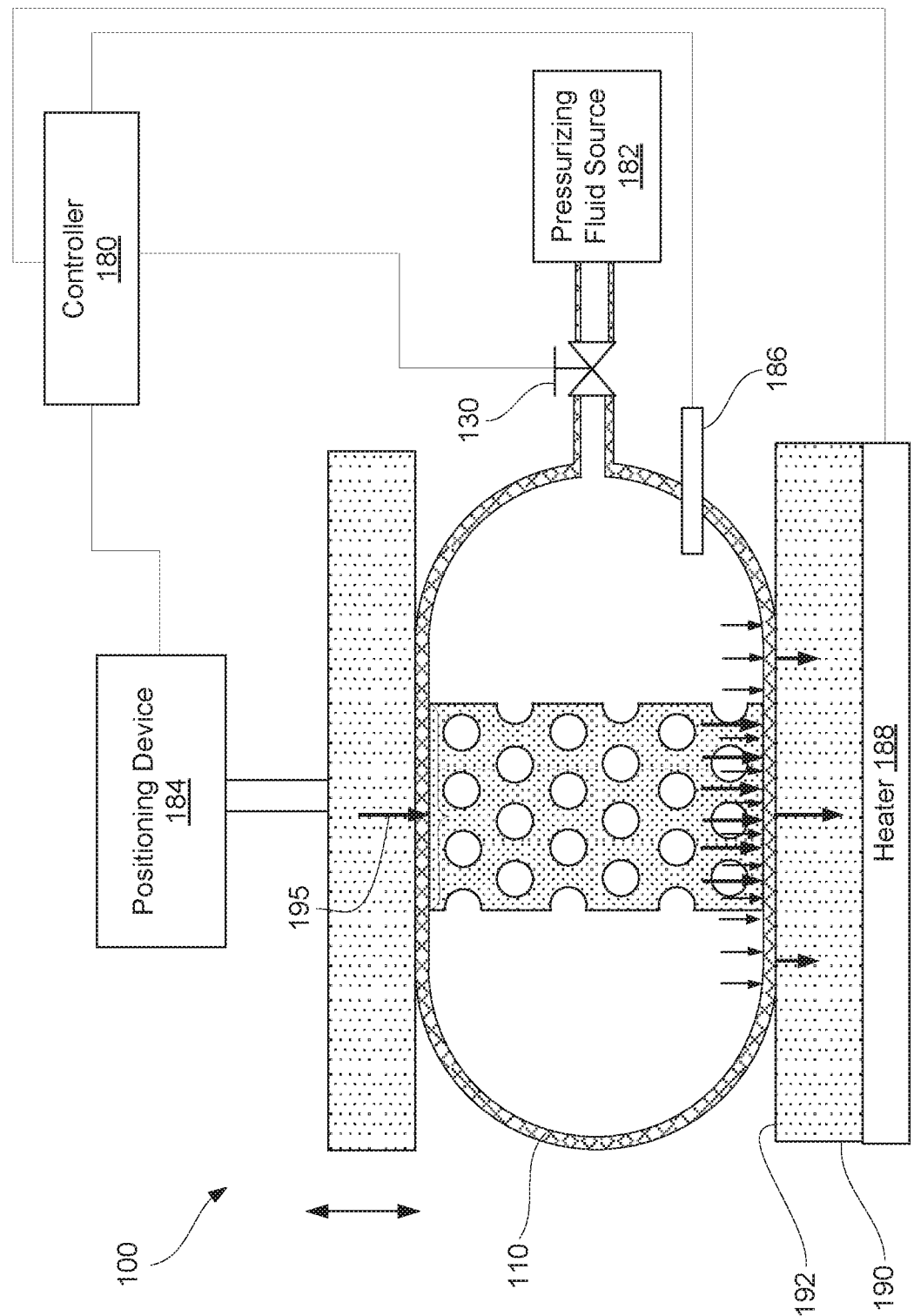

Referring to FIG. 1D, pressurizable tooling device 100 may comprise controller 180 and valve 130. Controller 180 may be communicatively coupled to valve 130 for controlling the flow of pressurizing fluid and thereby control first pressure 194a and corresponding force.

In some embodiments, pressurizable tooling device 100 further comprises positioning device 184 communicatively coupled to controller 180. As such, controller 180 may be used to control operation of positioning device 184 and the force which positioning device 184 exerts on the flexible wall. Some aspects of positioning device 184 are described above. For example, positioning device 184 supports contact member 120 and is operable to move contact member 120. Positioning device 184 may be used to control the level of contact (e.g., pressure and/or force) between contact member 120 and contact portion 116b of second surface 116 of flexible wall 110, which in turns determines second pressure 194b. Object 190 may be supported using back support 170, against the force exerted by positioning device 184. The force with which positioning device 184 is pressed against flexible wall may be controlled to help with ply shearing/slipping relative to each other and reduce or eliminate wrinkling. Furthermore, this force control may be used to eliminate or reduce "bridging". In some embodiments, the relative position of back support 170 and positioning device 184 determine second pressure 194b.

Positioning device 184 may directly support contact member 120 as, for example, shown in FIG. 1B. Specifically, positioning device 184 may be an arm (e.g., a robotic arm) movable within pressure chamber 101.

A brief example of processing object 190 in pressurizable tooling device 100 shown in FIG. 1B may be useful to illustrate some feature of pressurizable tooling device 100. Object 190 may be originally formed on a planar substrate (e.g., a forming mandrel) or pre-shaped using other tools, before being shaped into the final form as shown in FIG. 1B. Furthermore, object 190 may be already shaped into the final form prior to utilizing inflatable tooling device 100, and pressurizable tooling device 100 may be used to retain this shape. Pressurizable tooling device 100 may be used in conjunction with other tools/devices.

In some embodiments, the shaping of object 190 may be performed using a combination of back support 170 and positioning device 184, e.g., forcing object 190 into the corner of back support 170 using force applied to positioning device 184 and transferred to flexible wall 110 and then to object 190. It should be noted that this force may need to be applied at a particular location, e.g., at the corner. In some embodiments, forcing object 190 against back support 170 may involve pressurizing the interior of pressure chamber 101 thereby creating first pressure 194a in addition or instead of applying a force to positioning device 184. Back support 170 is effectively operable as a form for object 190 and object may change its shape until it conforms to back support 170. When object 190 is a multi-ply object (e.g., a composite object), during this shaping operation, the inner plies may slip relative to the outer plies to avoid wrinkling. Various combinations of forces and/or pressures (as further described below with reference to FIGS. 2A and 2B) may be used to avoid wrinkling and/or to ensure that object 190 has a desired shape and size/thickness (e.g., a desired fiber to volume ratio). For example, second pressure 194b (and the corresponding force) may be applied before applying first pressure 194a (and the corresponding force) to allow the inner plies to slip and to avoid wrinkling. First pressure 194a (and the corresponding force) may be then controlled to achieve a desirable thickness of object 190.

Referring to FIG. 1D, in some embodiments, controller 180 is configured to independently control first pressure 194a and second pressure 194b and corresponding forces.

For example, first pressure 194a and the corresponding force may be controlled by controlling valve 130, while second pressure 194b and the corresponding force may be controlled by controlling positioning device 184. Operation of valve 130 may be independent of operation of positioning device 184.

Pressurizable tooling device 100 may further comprising sensor 186 communicatively coupled to controller 180. Some examples of sensor 186 include, but are not limited to, a pressure sensor, a temperature sensor, and a visual sensor. Controller 180 may be configured to control one or more of first pressure 194a and second pressure 194b based on the input received from sensor 186. Other processing parameters may be also controlled based on the sensor input.

In some embodiments, pressurizable tooling device 100 further comprises heater 188. Heater 188 may be communicatively coupled to controller 180 and configured to control temperature of object 190. Specifically, during operation, heater 188 may be thermally coupled to object 190.

Method Examples

Figure 2:
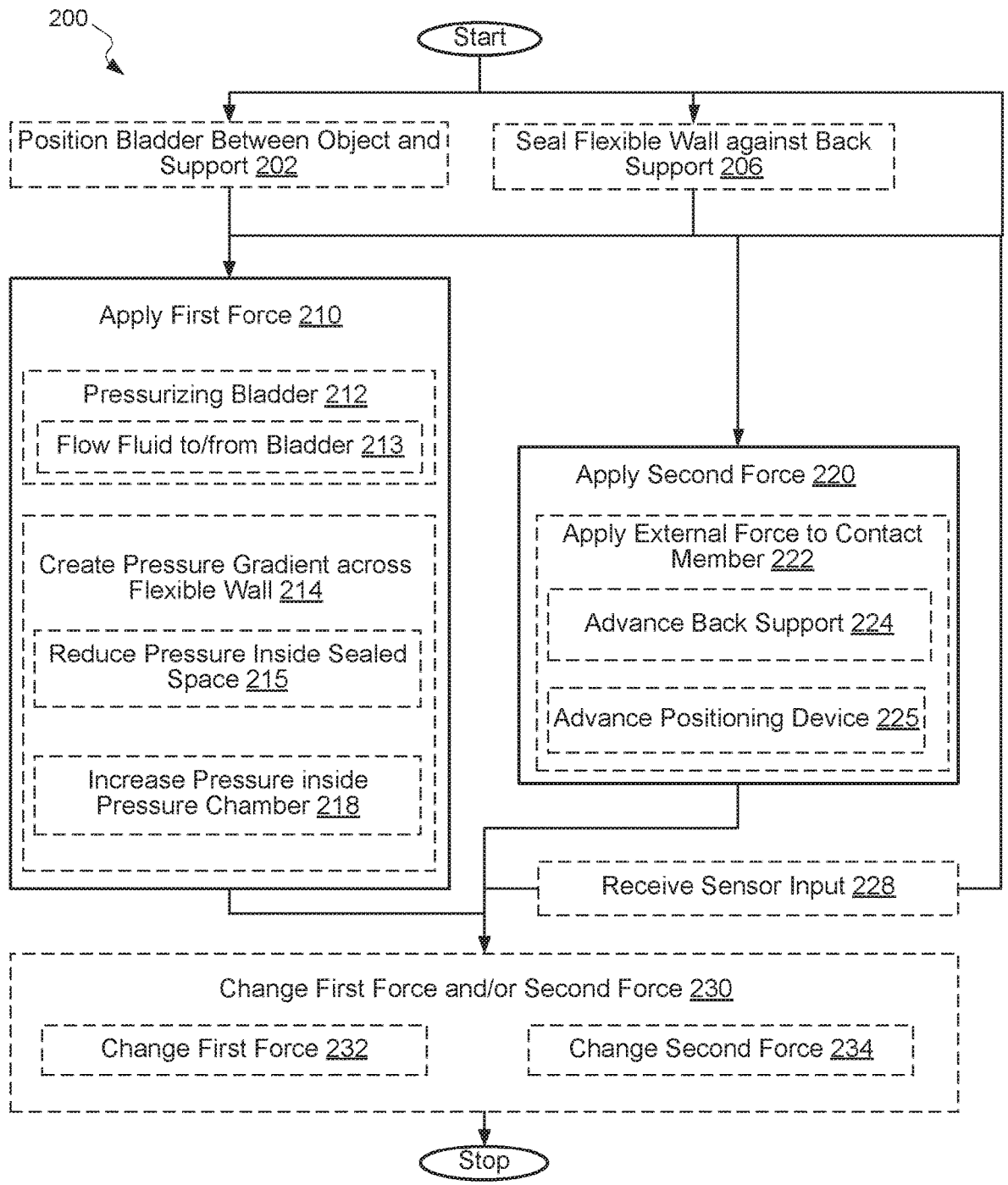
FIG. 2 is a process flowchart corresponding to a method of processing an object, in accordance with some embodiments.

FIG. 2 illustrates a process flowchart corresponding to method 200 of controlling application of forces 193a and 193b to first portion 192a and second portion 192b of surface 192 of object 190.

In some embodiments, operations of method 200 are performed using an example of pressurizable tooling device 100 shown in FIG. 1A. In these embodiments, method 200 may comprise positioning bladder 111 between object 190 and back support 170 (referring to block 202 in FIG. 2). This positioning operation may be performed while the pressure inside bladder 111 is less than the pressure outside of bladder 111. For example, contact member 120 is compressible, and the positioning operation may be performed while contact member 120 is compressed.

Alternatively, operations of method 200 are performed using an example of pressurizable tooling device 100 shown in FIGS. 1B and 1C. In these embodiments, method 200 may comprise sealing flexible wall 111 against back support 170 (referring to block 206 in FIG. 2). As shown in FIGS. 1B and 1C, object 190 is disposed in a sealed space between flexible wall 120 and back support 170.

Figure 3:
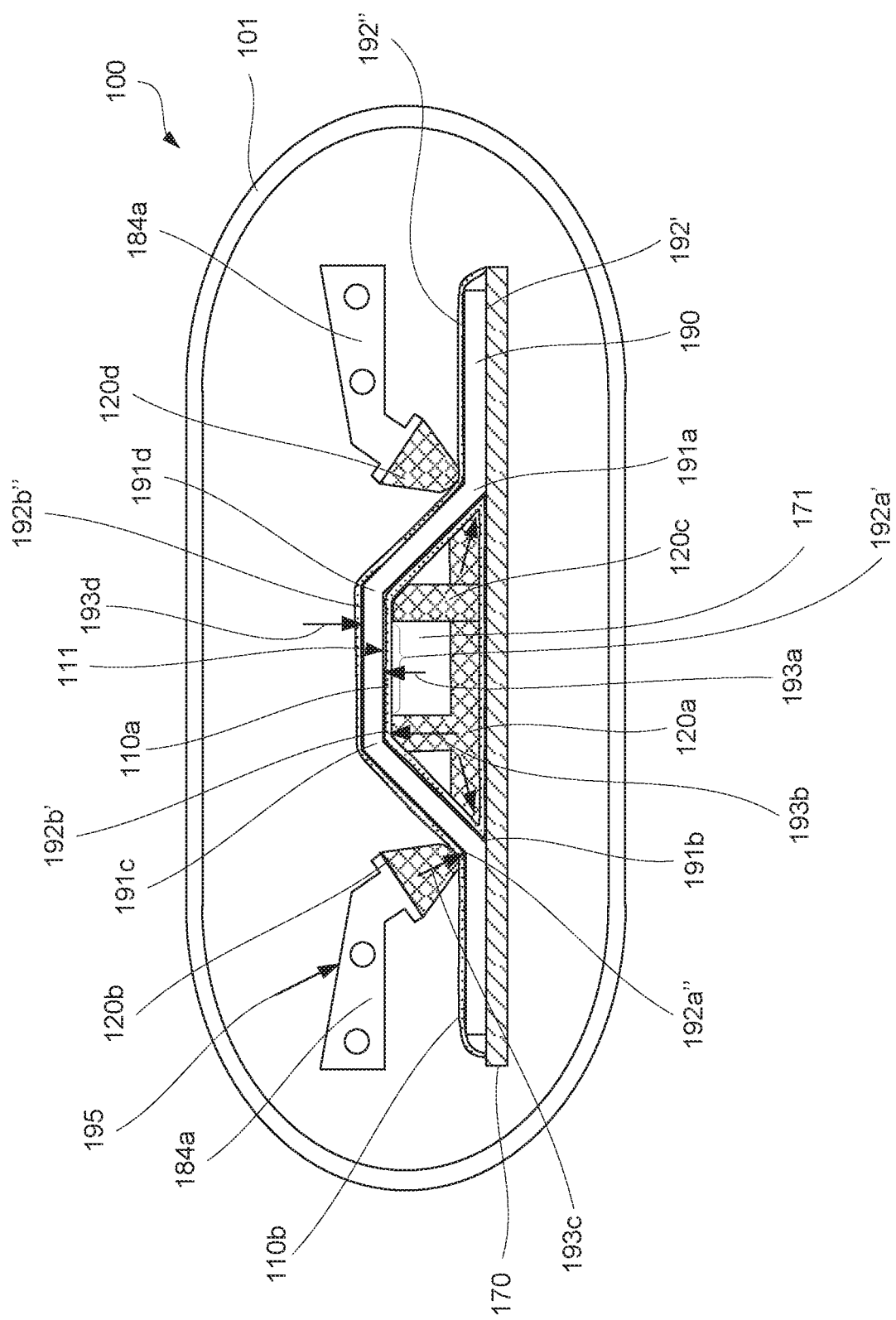
FIG. 3 is an example of a pressurizable tooling device, in accordance with some embodiments.

Method 200 comprises applying first force 193a to first portion 192a (referring to block 210 in FIG. 2). Referring to the example shown in FIG. 1A, first force 193a may be applied using bladder 111 formed by flexible wall 110. Specifically, applying first force 193a may comprise pressurizing bladder 111 (referring to block 212 in FIG. 2) or, more specifically, flowing the pressurizing fluid into bladder 111 (referring to block 213 in FIG. 3).

Referring to the example shown in FIG. 1B, first force 193a may comprise creating a pressure gradient across flexible wall 110 (referring to block 214 in FIG. 2). In other words, a pressure difference is created between the sealed space and the area outside of the sealed space, i.e., inside and outside of flexible wall 110. Operation 214 may comprise reducing the pressure in the sealed space (referring to block 215 in FIG. 2). For example, operation 215 may be performed while maintaining the pressure outside of the sealed space (e.g., inside pressure chamber 101) at a constant level. For example, the pressure outside of the sealed space may be an ambient pressure.

In some embodiments, operation 214 may involve increasing the pressure inside pressure chamber 101 (referring to block 218 in FIG. 2). In other words, the pressure in the area outside of the sealed space may be increased. Operation 218 may be performed while maintaining the pressure inside the sealed space at a constant level. In some embodiments, the constant level of the pressure inside the sealed space is at an ambient pressure level. Alternatively, operations 215 and operations 218 may be performed simultaneously.

Method 200 further comprises applying second force 193b to second portion 192b (referring to block 220 in FIG. 2). In some embodiments, applying second force 193b may comprise applying external force 195 to contact member 120.

Referring to the example shown in FIG. 1A, contact member 120 may be disposed inside bladder 111. If contact member 120 is permeable (as described above), then pressurizing bladder 111 during operation 212 further comprises applying first force 193a to second portion 192b in addition to applying second force 193b. Furthermore, if bladder 111 is positioned between object 190 and back support 170 (as, for example, shown in FIG. 1A), then applying external force 195 to the contact member may comprise advancing back support 170 toward object 190.

Referring to the example shown in FIG. 1B, external force 195 may be applied to contact member 120 using positioning device 184. For example, applying external force 195 to contact member 120 may comprise advancing positioning device 184 toward back support 170.

Figure 4A:
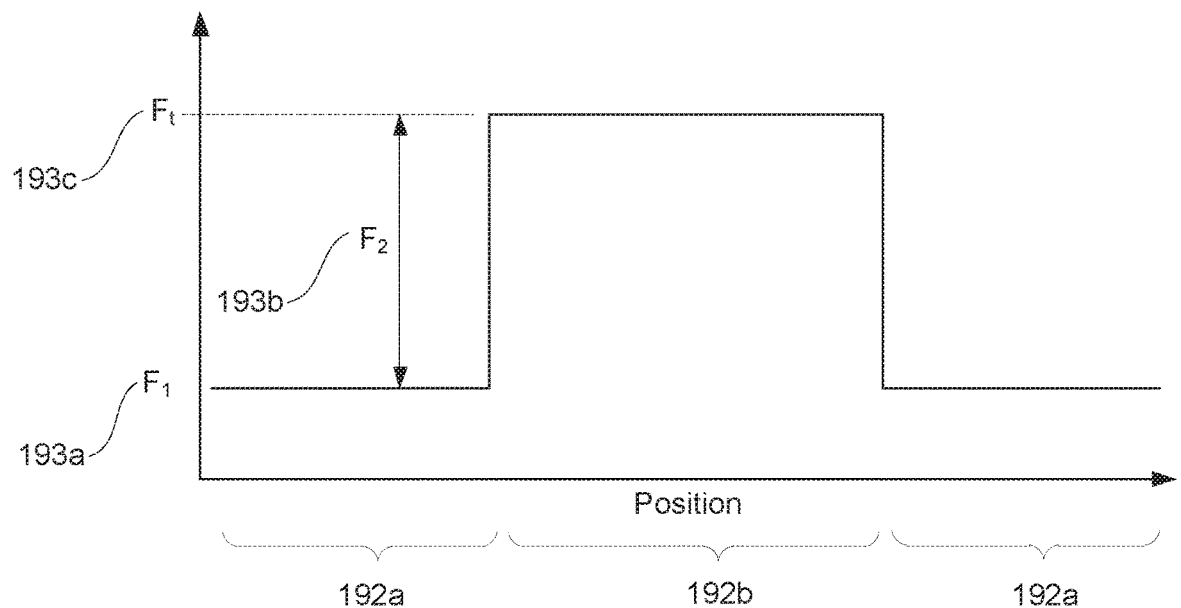
FIGS. 4A-4D are different examples of a pressure profile on the surface of the processed object created using the pressurizable tooling device, in accordance with some embodiments.
Figure 4B:
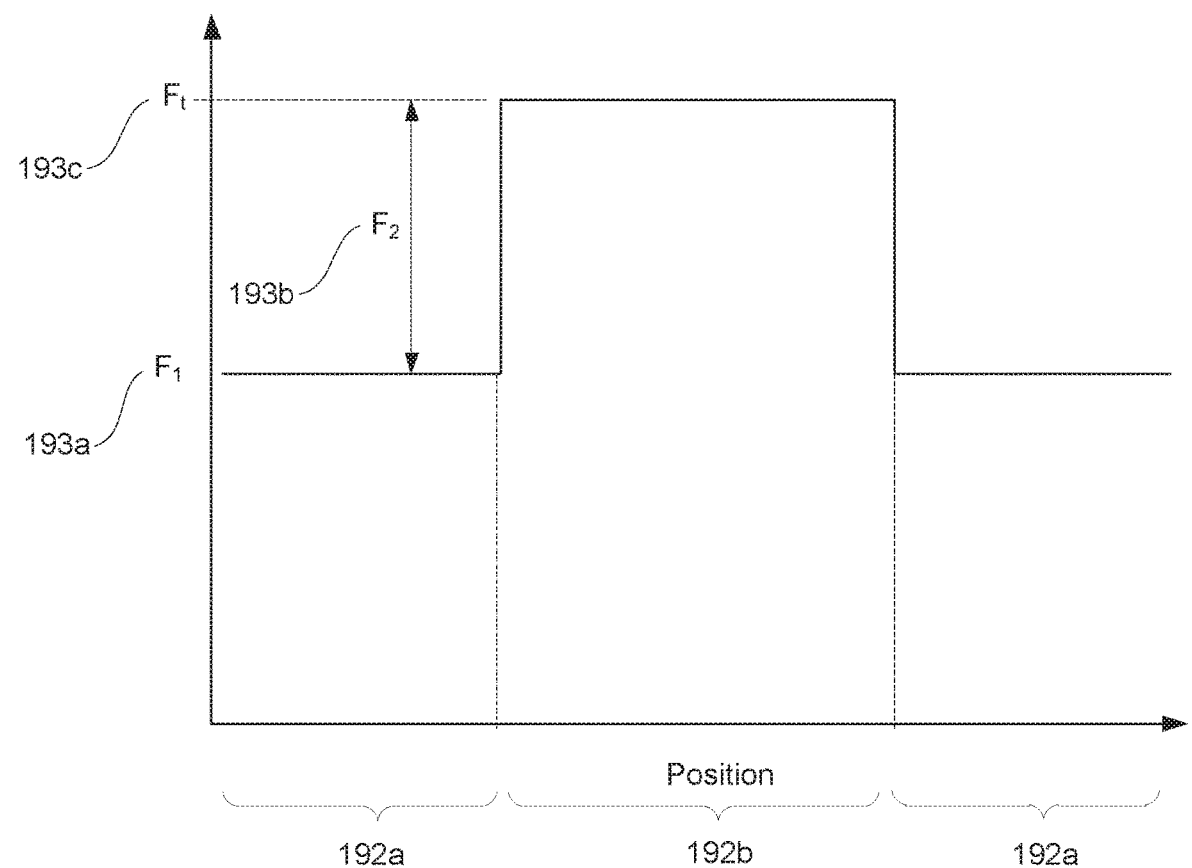

In some embodiments, the magnitude of first force 193a may be different from the magnitude of second force 193b as, for example, schematically shown in FIG. 4A. In this example, the vector of first force 193a and the vector of second force 193b have the same direction (i.e., both forces acting in the same direction). Furthermore, in this example, second portion 192b of the object surface experiences a combination of first force 193a and second force 193b (e.g., when contact member 120 is permeable), which may be referred to as total force 193c.

Figure 4C:
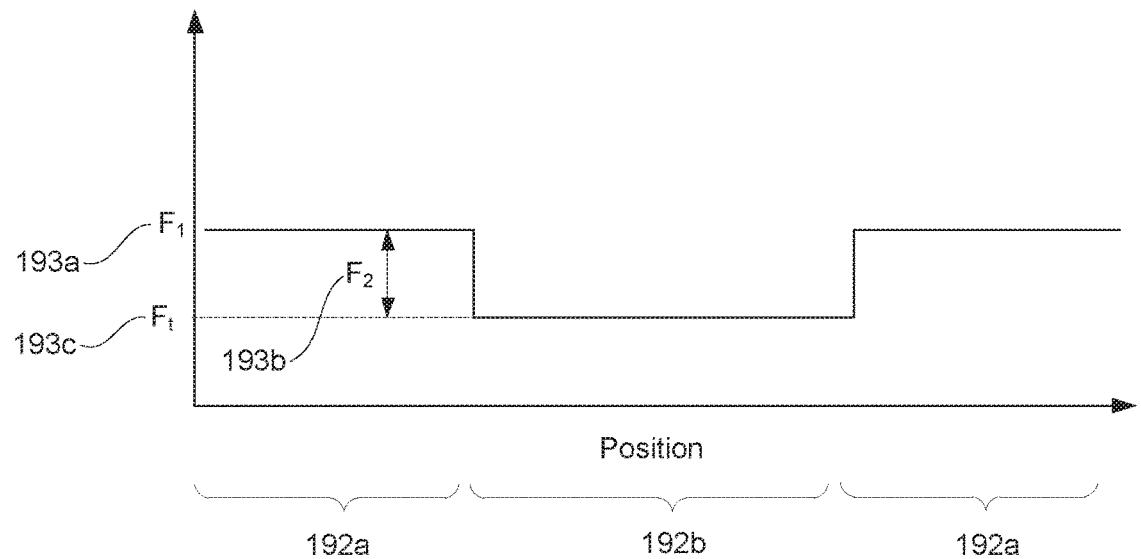
Figure 4D:
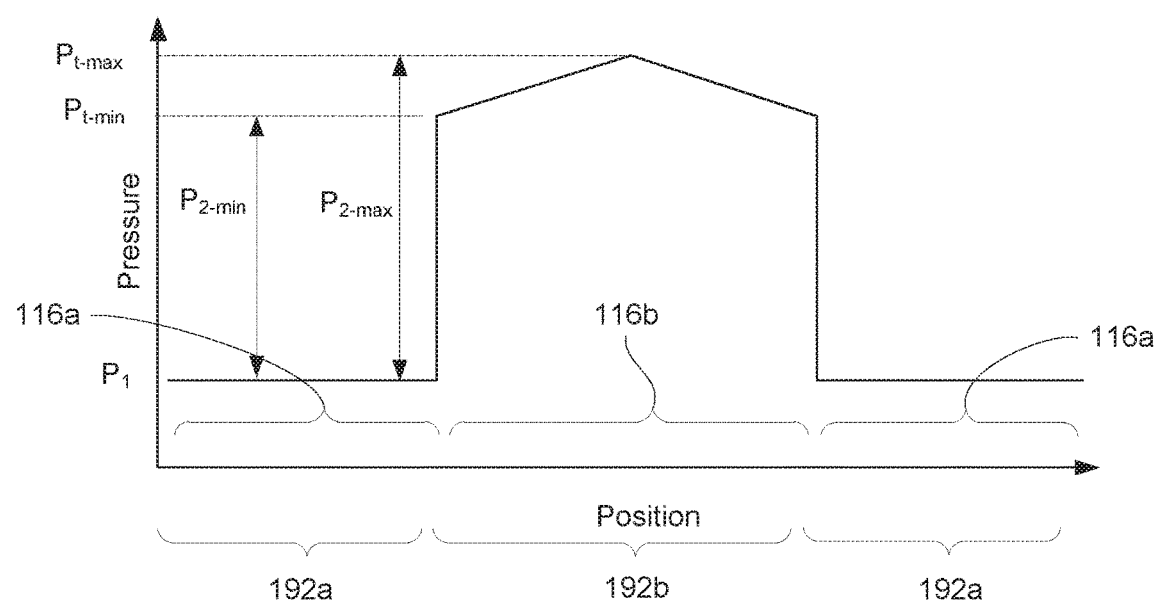

In some embodiments, as for example, shown in FIG. 4C, the vector of first force 193a and the vector of second force 193b have opposite direction. In this example, second portion 192b of the object surface also experiences a combination of first force 193a and second force 193b (e.g., when contact member 120 is permeable), which may be referred to as total force 193c, but total force 193c is less than first force 193a.

In some embodiments, prior to applying second force 193b, contact member 120 is positioned away from flexible wall 110. Alternatively, contact member 120 may be attached to flexible wall 110. This attachment features allows to achieve vectors of first force 193a and second force 193b having opposite directions (e.g., contact member 120 may pull a portion of flexible wall 110 away from object 190).

In some embodiments as, for example, shown in FIGS. 1B and 1C, second portion 192b of surface 190 comprises a corner. The corner may need a higher force than, for example, a planar portion of the object surface. This additional force may be used to prevent bridging in the corner.

In some embodiments, applying first force 193a during operation 210 and applying second force 193b during operation 220 overlap in time. Furthermore, these two operations may be staggered time. For example, second force 193b may be applied before applying first force 193a.

In some embodiments, method 200 further comprises changing first force 193a or second force 193b (referring to block 230 in FIG. 2). Operation 230 may be performed while applying first force 193a and second force 193b. In other words, operations 210, 220, and 230 may be performed at the same time. In some embodiments, operation 230 involves changing first force 193a (referring to block 232 in FIG. 2), while second force 193b may be kept the same. This example is illustrated by transition from FIG. 4A to FIG. 4B and may involve, for example, flowing the pressurized fluid into bladder 111. In some embodiments, operation 230 involves changing second force 193b (referring to block 234 in FIG. 2), while first force 193a may be kept the same.

In some embodiments, method 200 comprises receiving sensor input (referring to block 228 in FIG. 2). In these embodiments, changing first force 193a and/or second force 193b during operation 230 may be performed based on this sensor input. In some embodiments, the sensor input comprises one or more of a pressure input, a temperature input, and a visual input.

Method 200 may be used for controlling application of forces to different portions of two surfaces 192' and 192" of object 190. Method 200 may comprise positioning bladder 111, formed by first flexible wall 110a, within cavity 171 formed object 190 and back support 170. Bladder 111 may comprise a cavity with first contact member 120a positioned inside the cavity.

Method 200 may proceed with sealing second flexible wall 110b against object 190 or back support 170. Object 190 is disposed between second flexible wall 110b and back support 170. Method 200 also involves applying first force 193a to first portion 192a' of first surface 192' of object 190 using first flexible wall 110a. As described above, applying first force 193a may comprise pressurizing the bladder.

Method 200 may proceed with applying second force 193b to second portion 192b' of first surface 192' of using first flexible wall 110a. Second portion 192b' corresponds to first contact member 120a. Furthermore, second portion 192b' may be corner 191c of object 190 thereby requiring a different force than, for example, first portion 192a'.

Method 200 may also involve applying third force 193c onto third portion 192a" of second surface 192" using second flexible wall 110b. Third portion 192a" may correspond to second contact member 120b. Applying third force 193a may comprise applying external force 195 to second contact member 120b.

Finally, method 200 may also comprise applying fourth force 193d to fourth portion 192b" of second surface 192" of object 190 using second flexible wall 110b. Applying fourth force 193d may comprise applying a pressure across second flexible wall 110b. For example, pressure chamber 101 shown in FIG. 3 may be pressurized.

Conclusion

Although the foregoing concepts have been described in some detail for purposes of clarity of understanding, after reading the above-disclosure it will be apparent that certain changes and modifications may be practiced within the scope of the appended claims. It should be noted that there are many alternative ways of implementing the processes and systems. Accordingly, the present examples are to be considered as illustrative and not restrictive.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

What is claimed is:

1. A method of controlling application of forces to a first portion and a second portion of a surface of an object, the method comprising:
    sealing a flexible wall against a back support, the object disposed in a sealed space between the flexible wall and the back support, wherein a contact member is disposed inside the sealed space and is supported by a positioning device, operable to move the contact member relative to the flexible wall;
    applying a first force to the first portion of the surface using the flexible wall; and
    applying a second force to the second portion of the surface using the flexible wall.

2. The method of claim 1, wherein applying the first force comprises creating a pressure gradient across the flexible wall.

3. The method of claim 2, wherein creating the pressure gradient across the flexible wall comprises reducing a pressure in the sealed space.

4. The method of claim 3, wherein reducing the pressure in the sealed space is performed while maintaining a pressure outside of the sealed space at a constant level.

5. The method of claim 4, wherein the pressure outside of the sealed space is an ambient pressure.

6. The method of claim 2, wherein creating the pressure gradient across the flexible wall comprises positioning the flexible wall, the back support, and the object into a pressure chamber and increasing the pressure inside the pressure chamber.

7. The method of claim 6, wherein increasing the pressure inside the pressure chamber is performed while maintaining a pressure inside the sealed space at a constant level.

8. The method of claim 7, wherein the constant level of the pressure inside the sealed space is at an ambient pressure level.

9. The method of claim 1, wherein applying the second force comprising applying an external force to the contact member, the second portion of the surface corresponding to the contact member.

10. The method of claim 9, wherein applying the external force to the contact member is performed using the positioning device.

11. The method of claim 10, wherein applying the external force to the contact member comprises advancing the positioning device toward the back support.

12. The method of claim 1, wherein a magnitude the first force is different from a magnitude of the second force.

13. The method of claim 1, wherein applying the first force and applying the second force overlap in time.

14. The method of claim 1, wherein applying the first force and applying the second force are staggered in time.

15. The method of claim 1, wherein the second portion of the surface comprises a corner.

16. A method of controlling application of forces to different portions of two surfaces of an object, the method comprising:
    positioning a bladder, formed by a first flexible wall, within a cavity formed by the object and a back support, the bladder comprising an internal cavity with a first contact member positioned inside the internal cavity and supported by a positioning device, operable to move the first contact member relative to the first flexible wall;
    sealing a second flexible wall against the object or the back support, the object disposed between the second flexible wall and the back support;

applying a first force to a first portion of a first surface of the object using the first flexible wall, applying the first force comprising pressurizing the bladder;

applying a second force to a second portion of the first surface of the object using the first flexible wall, the second portion of the surface corresponding to the first contact member; and applying a third force onto a third portion of a second surface of the object using the second flexible wall, the third portion of the second surface corresponds to a second contact member, applying the second force comprising applying an external force to the second contact member.

17. The method of claim 16, wherein at least a portion of the object is disposed between the first flexible wall and the second flexible wall.

18. The method of claim 16, wherein each of the first force, the second force, and the third force are independently controllable.

19. The method of claim 16, further comprising changing one of the first force, the second force, or the third force while applying all of the first force, the second force, and the third force.

20. The method of claim 16, further comprising applying a fourth force to a fourth portion of the second surface of the object using the second flexible wall, applying the fourth force comprises applying a pressure across the second flexible wall.

21. A pressurizable tooling device for controlling application of forces to different portions of two surfaces of an object, the pressurizable tooling device comprising:
a back support;
a flexible wall, comprising an inner surface and an outer surface,
the inner surface comprising a contact portion and a non-contact portion,
the outer surface is operable to seal against the object or the back support;
a contact member, operable to contact the contact portion of the inner surface of the flexible wall, the contact member being positioned away from the non-contact portion of the inner surface of the flexible wall; and
a positioning device, supporting the contact member and operable to move the contact member relative to the flexible wall.

22. The pressurizable tooling device of claim 21, further comprising a pressure chamber, wherein the back support, the flexible wall, the contact member, and the positioning device are disposed inside the pressure chamber.

23. The pressurizable tooling device of claim 21, wherein the contact member is permeable.

24. The pressurizable tooling device of claim 23, wherein the contact member is compressible.

25. The pressurizable tooling device of claim 24, wherein the contact member is selected from the group consisting of an open-cell foam and a spring.

26. The pressurizable tooling device of claim 21, wherein a surface of the contact member contacting the contact portion of the inner surface is non-planar.

27. The pressurizable tooling device of claim 21, wherein the flexible wall is formed from an elastomeric material.

28. The pressurizable tooling device of claim 22, wherein the flexible wall comprises a seal for sealing the flexible wall against the back support in the pressure chamber.

29. The pressurizable tooling device of claim 28, wherein the seal extends an entire perimeter of the flexible wall.

30. The pressurizable tooling device of claim 21, further comprising a controller and a sensor communicatively coupled to the controller, wherein the sensor is selected from the group consisting of a pressure sensor, a temperature sensor, and a visual sensor, and wherein the controller is configured to control pressure, applied by the contact member onto the flexible wall, based on input from the sensor.

31. The pressurizable tooling device of claim 21, further comprising a controller communicatively coupled to the positioning device and operable to control position of the contact member.

* * * * *